United States Patent [19]

Mosharov et al.

[11] Patent Number: 5,307,675
[45] Date of Patent: May 3, 1994

[54] LUMINESCENT PRESSURE SENSITIVE COMPOSITION

[75] Inventors: Vladimir Mosharov, Zhukovsky; Mikhael Kuzmin, Moscow; Anatolii Orlov, Orlov; Vladimir Radchenko, Zhukovsky; Nikita Sadovskii; Igor Troyanovsky, both of Moscow, all of U.S.S.R.

[73] Assignee: Aliteco AG, Zug, Switzerland

[21] Appl. No.: 856,284

[22] Filed: Mar. 24, 1992

[30] Foreign Application Priority Data

Mar. 2, 1992 [EP] European Pat. Off. ........ 92103543.2

[51] Int. Cl.⁵ ............................................. G01M 9/00
[52] U.S. Cl. ......................................... 73/147; 73/705
[58] Field of Search ................... 73/147, 705, 700

[56] References Cited

U.S. PATENT DOCUMENTS 5,186,046  2/1993  Gouterman et al. ............... 73/147

Primary Examiner—Donald O. Woodiel
Attorney, Agent, or Firm—Townsend and Townsend Khourie and Crew

[57] ABSTRACT

A luminescent pressure sensitive composition for determining an air pressure pattern includes a binder, preferably a polymer binder, with a luminophore, of which the intensity of luminescence depends on air pressure. The luminophore of which the intensity of luminesence depends on air pressure (active luminophore) is mixed together with an additional luminophore of which the intensity of luminescence has a different dependence on air pressure than the active or reference luminophore.

7 Claims, 7 Drawing Sheets

LUMINESCENT PRESSURE SENSITIVE COMPOSITION

BACKGROUND OF THE INVENTION

The present invention relates to a luminescent pressure sensitive composition for the determination of air pressure patterns on the surface of a body. This invention can be used in various fields of science and technology. It is particularly suitable in determining the air pressure field in aerodynamic investigations.

The most important problem in aerodynamics concerns with the determination of distributed forces acting on a body.

The basic component of these forces originates from the distributed air pressure on a surface of the body. The problem in defining the distributed forces involves the determination of the pressure pattern on the surface of the body. Thus, an appropriate method should be provided to measure air pressure at each point of a surface in experimental researches.

The method uses a surface coating which contains probe molecules (luminophores) that emit luminescence when excited by an appropriate light source. Oxygen molecules in the air interfere with the process of the luminescence and decrease ("quench") the amount of luminescence. As a result, the luminescence of the paint varies as functions of the partial pressure of oxygen. Therefore, the parameters of luminescence (intensity and lifetime) can be related to the static pressure of the air at the coated surface.

A luminescent pressure sensitive composition for the determination of pressure patterns on models in a wind tunnel has been employed. See, for example, J. Kavandi, J. Callis, M. Gouterman, G. Khalil, D. Wright, E. Green, D. Burns, B. McLachian "Luminescent barometry in wind tunnels". Rev. Sci. Instrum., 61, 11, November 1990).

Their composition includes platinum octaethylpoiphyrin (PtOEP) which is dissolved in Genesee Polymers GP-197 dimethylsiloxane polymer solution. The solution is applied on the surface of interest. The 1,1,1-trichloroethane solvent evaporates, and leaves a smooth film. The luminescence of luminophore-PtOEP was excited by an UV lamp with a filter that only allowed light with wavelength above 400 nm to pass through.

Other studies for determining air pressure pattern on a surface have also been conducted. See, for example, (M. J. Morris, J. F. Donovan, J. T. Kegelman, S. D. Schwab, R. L. Levy, R. C. Crites. "Aerodynamic Applications of Pressure-Sensitive Paint". 30th Aerospace Sciences Meeting and Exhibit, Jan. 6-9, 1992/Reno, Nev.

The specific formulation of the composition was not specified. The luminescence of the composition was excited by visible blue light and was detected by a video camera.

The determination of air pressure pattern was carried out by using images of the model taken at wind-off and at wind-on conditions.

The approximation of the luminescence intensity of the composition was modeled by the Stern-Volmer relation:

$$I_o/I = 1 + K_2 P_{O2}$$

where 1 is the intensity of luminescence, $l_o$ is the intensity of luminescence in the absence of oxygen, $P_{O2}$ is the partial pressure of oxygen, $K_q$ is the Stern-Volmer constant, or $$l_o/l = 1 + KP,$$

where P is the pressure of air.

In the various experiments carried out in a wind tunnel, the results were influenced by model movement and dust contamination during the flow.

The emitted light from a specific point of a surface covered by the composition depended on the amount of excitation light from the light source, but the amount of light received depended on the distance from a specific point to the light source and on the angle of the surface. Furthermore, the intensity of emitted light received by the camera depended on the distance from the camera and on the angle of the surface. Since the model generally has a complex surface, both the distance and the angle to the light source and the camera varies at each point over the surface of the model. Therefore $l_o$ varies at each point over the model. Usually in real experiments $l_o$ is not used as the reference intensity. To determine the pressure at a specific point, the intensity at each point 1, at atmospheric pressure P (wind-off condition) is divided by its intensity of the air-flow (wind-on condition).

$$l_i/l = (1 + KP)/(1 + KP_r)$$

K- is determined in a calibration pressure chamber.

If the camera and light source are fixed to the tunnel's walls the optical data is recorded at atmospheric pressure at each angle-of-attack.

However, since during the flow the model is subject to movements due to the action of aerodynamic forces and the surface of the model is contaminated by dust particles during a test, the accuracy of the pressure measurements was low.

SUMMARY OF THE INVENTION

The present invention makes it possible to eliminate the above mentioned problems thus making it possible to perform a real and precise determination of the air pressure pattern.

The luminescent pressure sensitive composition particularly suitable for determining the air pressure pattern includes a polymer binder.

This binder contains two different types of luminophores (active luminophores and reference luminophores) which are mixed together. The active luminophore luminescence intensity depends on air pressure. The reference luminophore luminescence intensity does not depend on the air pressure.

The reference luminophore spectral region of excitation does not coincide with the active luminophore spectral region of luminescenoe.

The spectral region of luminescence of the reference luminophore does not coincide with the spectral region of luminescence of the active luminophore or (depending on the type of composition) the luminescence lifetime of the active luminophore differs from that of the reference luminophore lifetime.

The lifetime of luminescence is defined as the time of decreasing of intensity of luminescence in $e(\approx 2,73)$ times.

Evaporation of solvent and solidification of polymer binder leads to a uniform film on the surface.

The luminescence of active and reference luminophores is excited by an appropriate light source. In the case of composition in which luminophores differ by decay time, the luminescence of the composition is excited by a pulsed light source.

The intensity of luminescence of both types of luminophore is affected in the same way by dust, by the distance to the light source, by the distance to the light detector and by the angle of the surface.

Therefore it is possible to eliminate the influence of dust and model displacement by dividing the luminescence intensity of the reference luminophore by the luminescence intensity of the oxygen sensitive luminophore.

The result obtained depends only on air pressure.

$$I_{ir}/I = A + CP,$$

where $I_{ir}$ is the intensity of reference luminophore, and A and C are the constants that can be determined when performing a calibration in the pressure chamber.

The spectrum of luminescence of this invented composition with the internal reference consists of the spectrum of luminescence of the oxygen sensitive luminophore and the spectrum of luminescence of the reference luminophore.

To divide this spectrum there are two ways, which depend on the properties of the composition.
1. Using filters with appropriate transmittance.
2. Different integration time of the signal of total luminescence of the luminescence composition.

The procedure of dividing the total signal of luminescence is dependent on the lifetime of the components.

DESCRIPTION OF THE PREFERRED EMBODIMENTS

Example 1

Example of a pressure sensitive composition (composition 1).

Luminescence composition with the internal reference for the determination of pressure patterns containing a metal compound from the platinum group with the organic ligand as the oxygen sensitive luminophore 7-diethylamino-4-methylcoumarin as the internal reference luminophore and organosilicon polymer as a binder.

|  | % by mass |
|---|---|
| Genesee Polymer GP-197 dimethylsiloxane polymer | 99.85 |
| Platinum (II) octaethylporphyrin (PtOEP) | 0.10 |
| 7-diethylamino-4-methylcoumarin | 0.05 |

Figure 1A:
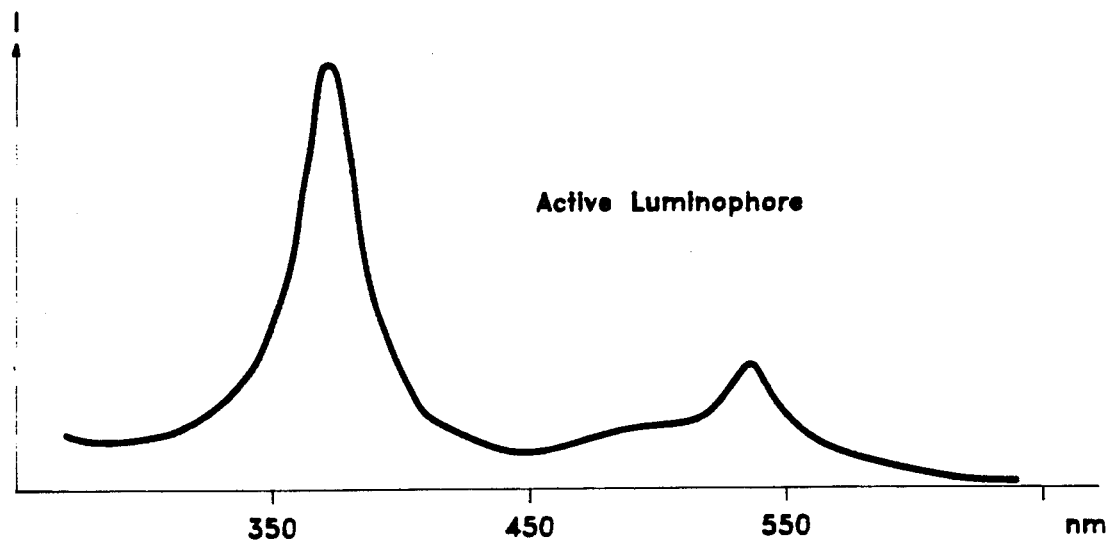
FIGS. 1a and 1b are excitation spectra of the pressure sensitive composition of Example 1.
Figure 1B:
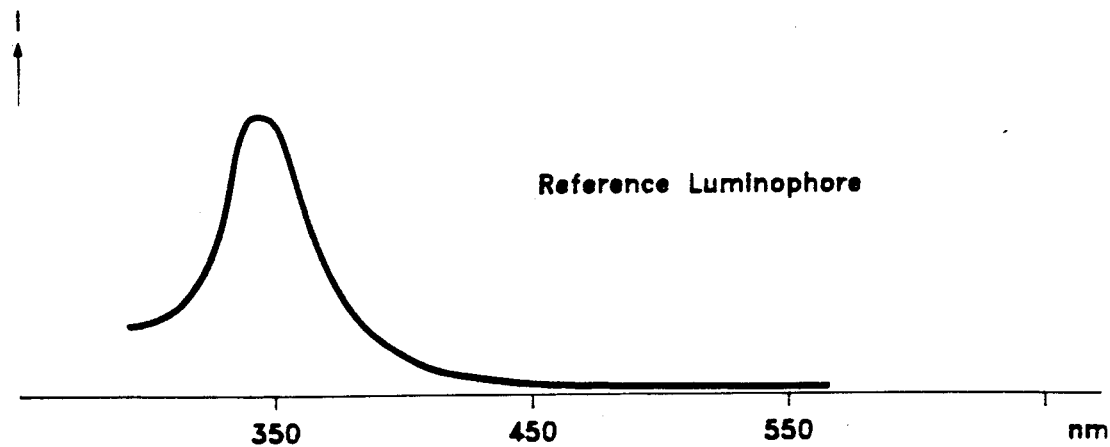

Excitation spectrums of active and reference luminophores of this composition are illustrated in FIGS. 1a and 1b.

Figure 2:
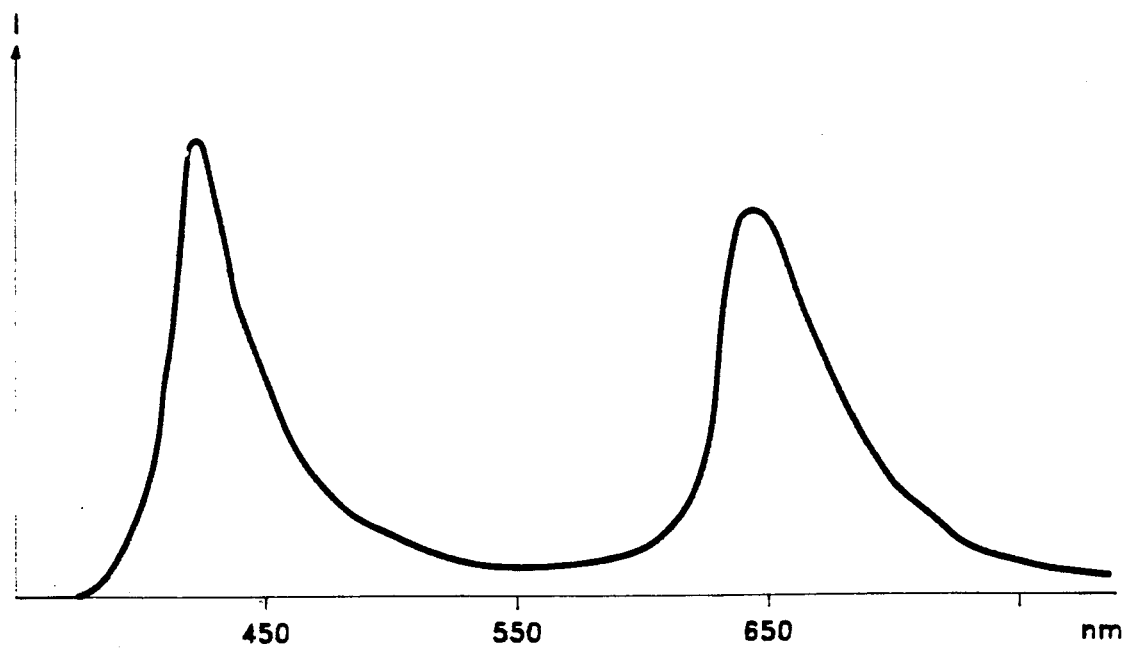
FIG. 2 illustrates the emission spectrum of the composition of Example 1.

The excitation of luminescence of composition with the internal reference is caused by a pulsed nitrogen laser (l=337.1 nm) or mercury arc lamp with an UV-filter. The procedure of separation of luminescence signal of platinum (II) octaethylporphyrin is carried out with filters having the appropriate transmittance. For PtOEP (active luminophore) the filter must transmit a light with wavelength above 500 nm. For 7-diethylamino-4-methylaminocoumarin (reference luminophore) the filter must transmit a light with wavelength in the spectral region 400–480 nm. See FIG. 2.

EXAMPLE 2

Example of a second pressure sensitive composition (composition 2).

Luminescent composition with the internal reference for the determination of pressure patterns containing a metal compound from the platinum group with the organic ligand as the oxygen sensitive luminophore and the inorganic luminophore yttrium oxide activated by europium ($Y_2O_3$:Eu) as the reference luminescence substance.

|  | % by mass |
|---|---|
| Genesee Polymer GP-197 dimethylsiloxane polymer | 70.00 |
| Platinum (II) octaethylporphyrin (PtOEP) | 0.10 |
| Inorganic luminophore $Y_2O_3$:Eu | 29.90 |

Figure 3A:
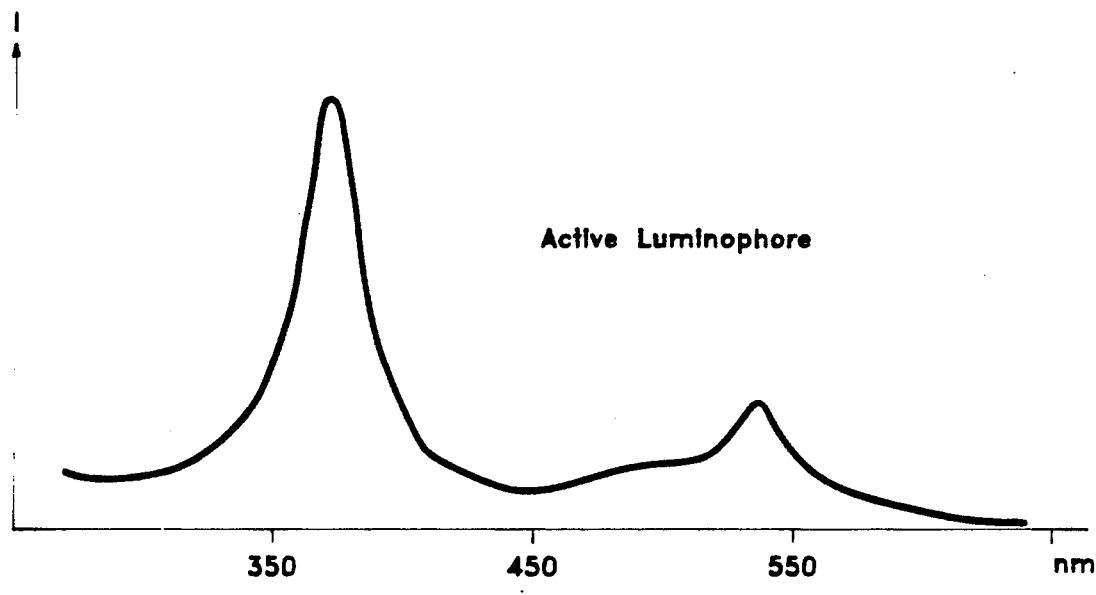
FIGS. 3a and 3b are the excitation spectra of the composition of Example 2.
Figure 3B:
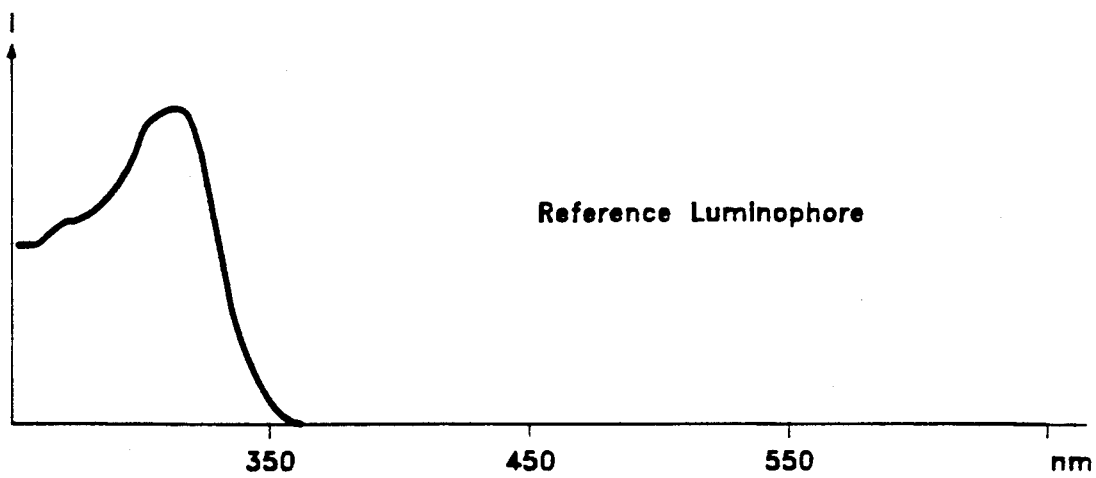

Excitation spectrums of active and reference luminophores of this composition are illustrated in FIGS. 3a and 3b.

The luminescence of thin powder inorganic luminophore $Y_2O_3$:Eu is observed in the spectral region 600–700 nm.

The lifetime of luminescence of PtOEP (active luminophore) is nearly 70 microseconds, and the lifetime of luminescence of $Y_2O_3$:Eu (reference luminophore) is nearly 100 milliseconds.

Figure 4A:
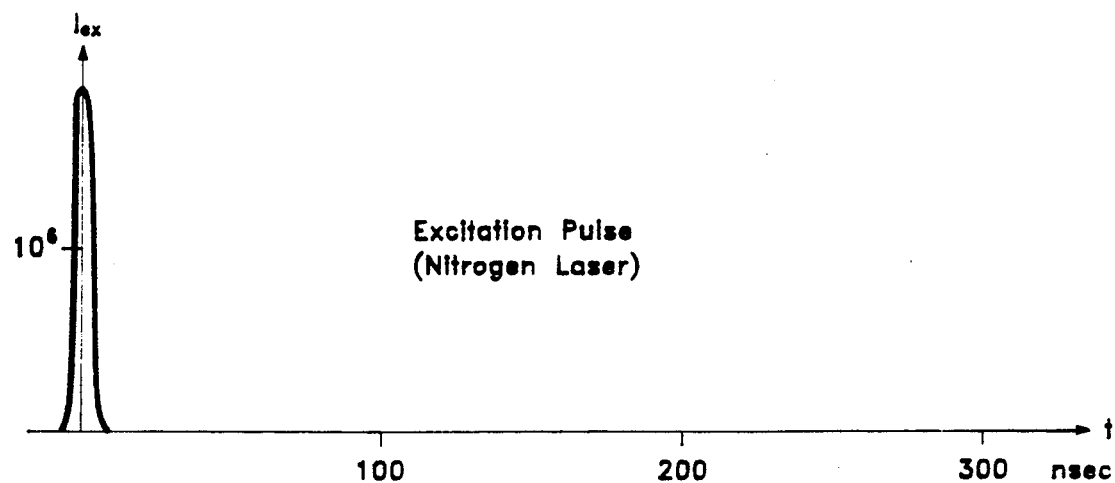
FIGS. 4a-4c are time diagrams of the luminescence of the composition of Example 2.
Figure 4B:
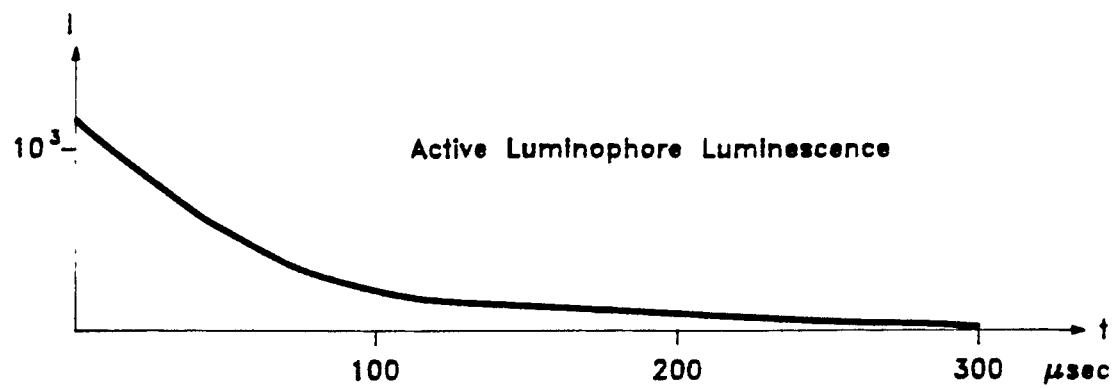
Figure 4C:
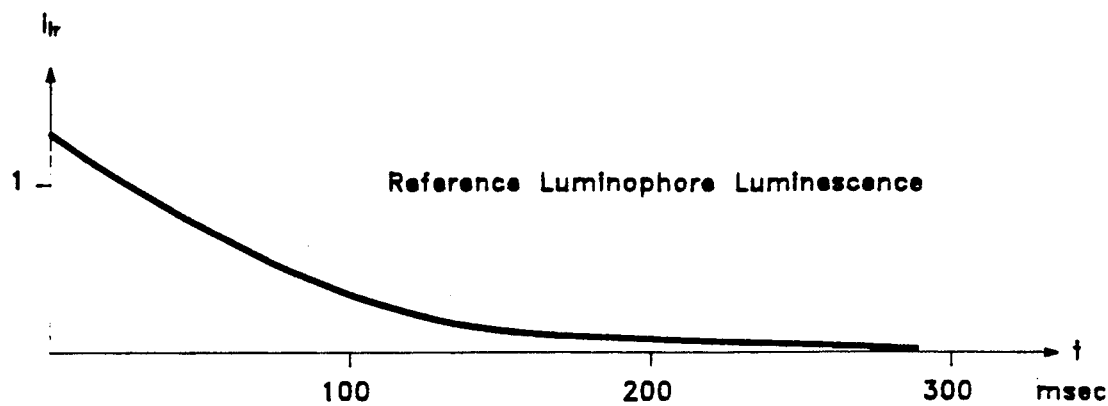

The excitation of luminescence of this composition is caused by a pulsed nitrogen laser or flash lamp. See time diagrams of FIGS. 4a-4c.

The beginning of integration of signal of luminescence of the composition is synchronized with the pulse of the source of excitation (nitrogen laser). Integration of the signal in microsecond range (0–100 msec) results in the signal of oxygen sensitive luminophore (PtOEP). The composition was developed in such a way that the full integral of luminescence of the reference and the active luminophores are approximately equal.

$$\int_0^\infty I_{ir} dt \approx \int_0^\infty I dt$$

In the range 0-100 μs the energy at the reference luminophore is practically zero.

$$\int_0^{100\mu s} l_{ir} dt \simeq 0$$

Integration of the signal in millisecond range (1-100 msec), after the decay of PtOEP results in the signal of the reference luminophore (Y$_2$O$_3$:Eu).

In aerodynamic investigations the luminescent composition with the reference for the determination of the pressure pattern is applied to the surface of the model to be investigated and to the sample for calibration.

Figure 5:
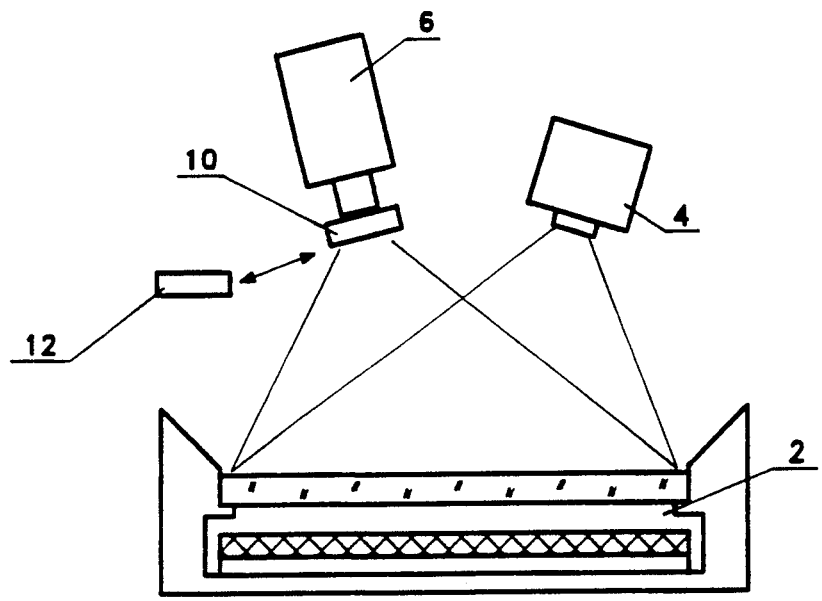
FIG. 5 illustrates a first embodiment of a calibration chamber.
Figure 6:
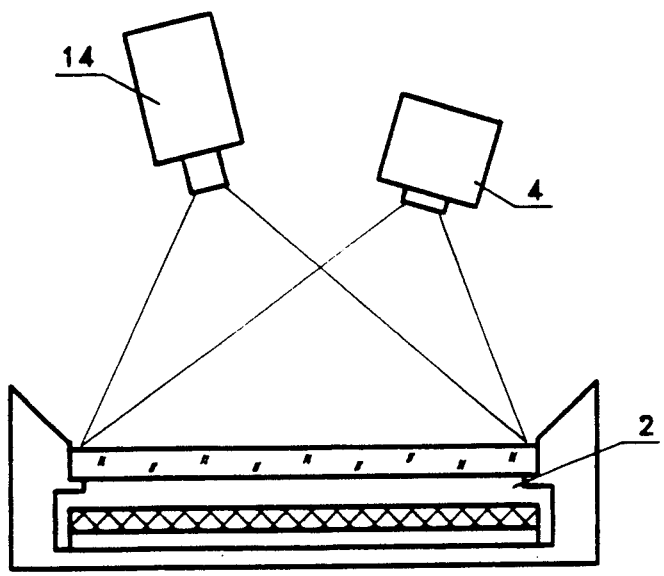
FIG. 6 illustrates a second embodiment of a calibration chamber.

The calibration chamber 2 is illustrated in FIG. 5 and FIG. 6.

The sample of luminescence composition with the internal reference is placed in the pressure chamber. The luminescence of the sample is excited by a source of light 4 as in a real aerodynamic experiment (pulsed N$_2$ laser).

The registration of the luminescence signal from a sample covered with the composition obtained by using the formula described in Example 1 (FIG. 5) is performed with a video camera 6 and interchangeable filters 10, 12. The data is acquired using two filters, one having a transmission in the spectral region 400-480 nm to obtain the reference data $l_{ir}$ and the other having a transmission in the spectral region above 600 nm to obtain the intensity of pressure sensitive luminophore l.

The separation of luminescent signals from a sample covered with the composition obtained by using the formula given in Example 2 regarding composition 2 is performed by a gateable intensified video camera 14 (FIG. 6). The beginning of integration of the camera is synchronized with the pulse of the laser. Integration of the signal in the microsecond range (0-100 msec) results in the signal of oxygen sensitive luminophore l. Integration of the signal in the millisecond range (1-100 msec) results in the signal of reference luminophore $l_{ir}$.

The pressure calibration of the composition is carried out using the same source of excited light, time delays and cameras as in the actual experiment for determination of pressure patterns.

Figure 7:
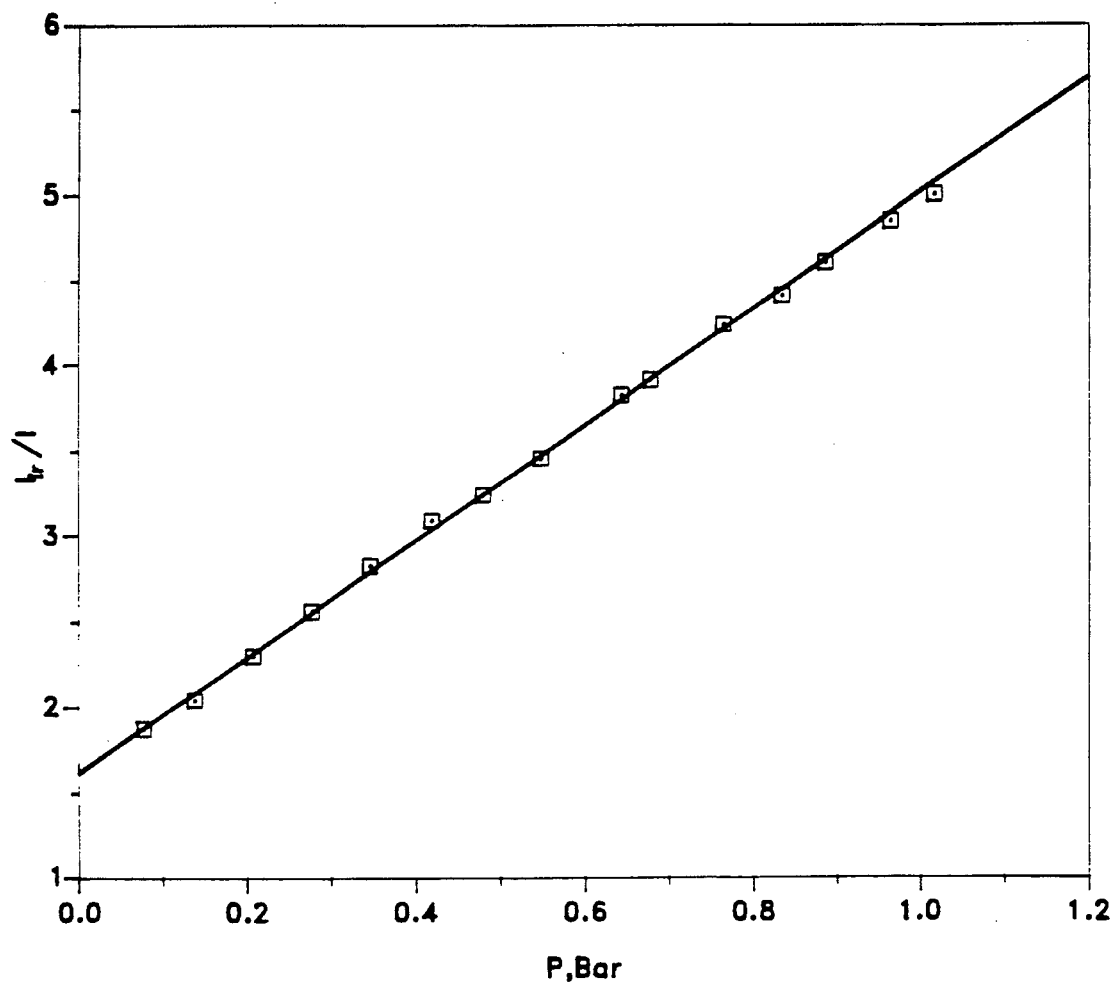
FIG. 7 is a diagram which illustrates a typical calibration curve.

The luminescence signal of the internal reference luminophore is divided by the luminescence signal of oxygen sensitive luminophore under each pressure of air to determine the calibration curve. A typical calibration curve is illustrated in FIG. 7.

Figure 8:
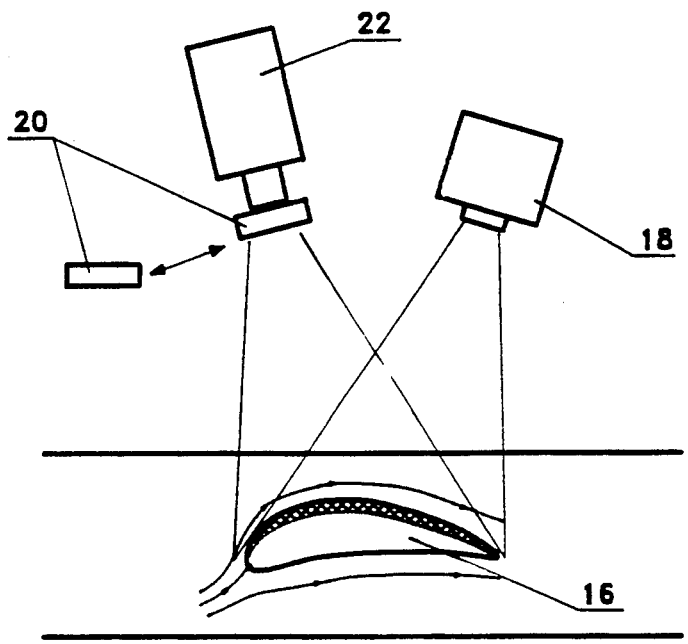
FIG. 8 illustrates an air foil in an air flow and illustrates a sensing system constructed according to a first embodiment of the present invention.
Figure 9:
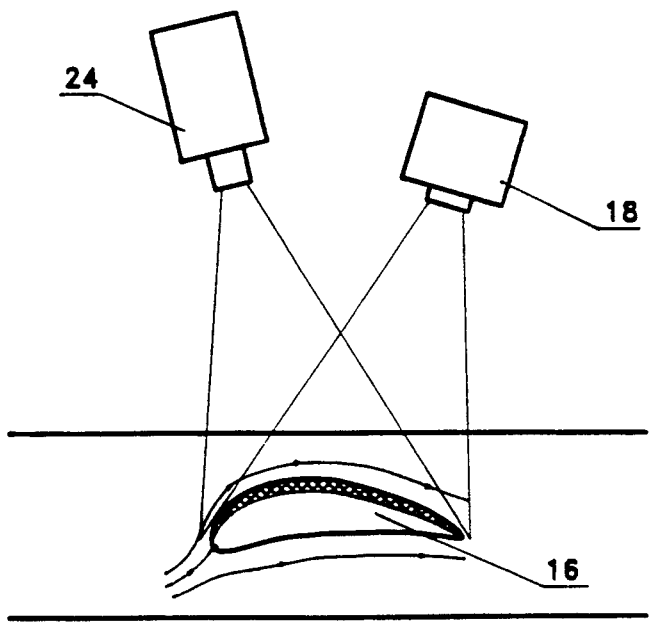
FIG. 9 illustrates an air foil in an air flow and illustrates a sensing system constructed according to a second embodiment of the present invention.

FIGS. 8 and 9, illustrate a model 16 placed in the air flow.

The luminescence of the oxygen sensitive luminophore and the luminescence of the reference luminophore of the composition are simultaneously excited by means of a pulsed N$_2$ laser 18. The signal of luminescence from surface of interest in each point of the investigated surface is registered from the oxygen sensitive luminophore and the reference luminophore by using filters 20 and a video camera 22 when the composition, which is described in Example 1, has been applied to the model (FIG. 3). A gateable intensified video camera 24 must be used if the model has been coated with a composition described in Example 2 (Composition 2).

The signal of internal reference at each point of the investigated surface is divided by the signal of luminescence of the oxygen sensitive luminophore to determine the pressure in accordance with the calibration curve.

The two images, which are acquired during wind-on condition at the same time, and respectively refer to the two different luminophore emissions, are taken with the model having exactly the same position and same dust contamination level.

With this composition, it is possible to measure pressure patterns on elastic models and parachute models.

What is claimed is:

1. Luminescent pressure sensitive composition for determining an air pressure pattern, comprising a binder, an active luminophore with an intensity of luminescence depending on air pressure, a reference luminophore having an intensity of luminescence with a dependence on air pressure which is different from that of said active luminophore, the reference luminophore having a spectral region of excitation which does not overlap a spectral region of emission of the active luminophore.

2. A luminescent pressure sensitive composition according to claim 1 wherein the intensity of luminescence of the reference luminophore does not depend on air pressure.

3. Composition according to claim 1 wherein the reference luminophore has a luminescence spectral region which differs from a luminescence spectral region of the active luminophore.

4. Composition according to claim 1 wherein the active luminophore has a luminescence lifetime which differs from a luminescence lifetime of the reference luminophore.

5. Composition according to claim 1 wherein said active luminophore is oxygen sensitive.

6. Composition according to claim 1 wherein a full time integral of luminescence of the reference luminophore and of the active luminescence are approximately equal.

7. A sensor comprising a pulsed or flashed light source, a luminescence detector, an active luminophore applied to a surface and exhibiting a first luminescence when subjected to light emitted by the light source and which is dependent on air pressure, a reference luminophore applied to the surface and exhibiting a second luminescence when subjected to light emitted by the light source, the second luminescence having a dependency on air pressure which is different from that of the first luminescence, the reference luminophore having a spectral region of excitation which does not overlap a spectral region of emission of the active luminophore, the detector being adapted to use a leading or a trailing edge of a pulse signal emitted by the light source to control the time when the luminescence of the active luminophore is detected and the time when the luminescence of the reference luminophore is detected.

* * * * *